(No Model.)
E. P. DOWD.
ATTACHMENT FOR LOCKING BICYCLES.
No. 578,629.   Patented Mar. 9, 1897.
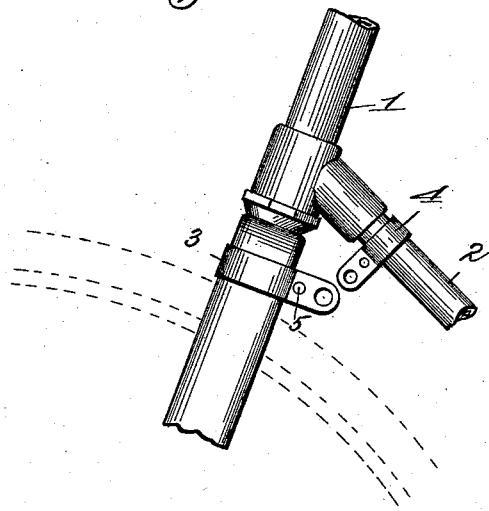
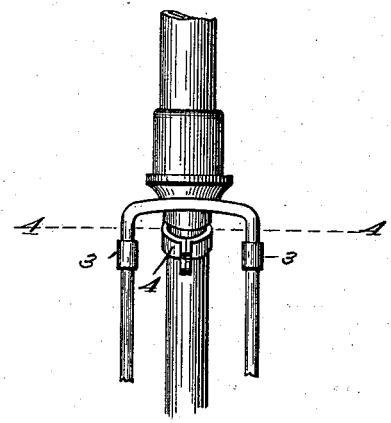
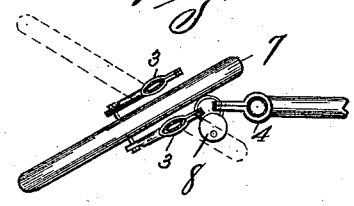
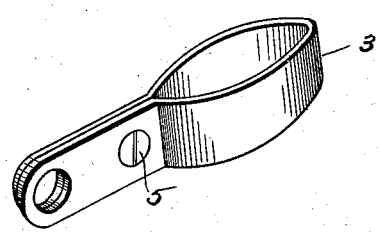
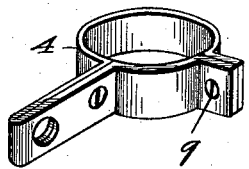
Attest:
M. Smith
S. G. Wells
Inventor:—
E. P. Dowd.
By Higdon & Higdon & Longan
Att'ys.
THE NORRIS PETERS CO., PHOTO-LITHO., WASHINGTON, D. C.

UNITED STATES PATENT OFFICE.

EDWARD P. DOWD, OF EAST ST. LOUIS, ILLINOIS.

ATTACHMENT FOR LOCKING BICYCLES.

SPECIFICATION forming part of Letters Patent No. 578,629, dated March 9, 1897.

Application filed April 17, 1896. Serial No. 588,057. (No model.)

*To all whom it may concern:*

Be it known that I, EDWARD P. DOWD, of the city of East St. Louis, St. Clair county, State of Illinois, have invented certain new and useful Improvements in Attachments for Locking Bicycles, of which the following is a full, clear, and exact description, reference being had to the accompanying drawings, forming a part hereof.

My invention relates to an attachment for locking bicycles; and it consists in the novel construction, combination, and arrangement of parts hereinafter described and claimed.

In the drawings, Figure 1 is a view in side elevation, illustrating the application of my device to a bicycle. Fig. 2 is a front elevation of the parts shown in Fig. 1. Fig. 3 is a perspective of a clip of which I make use. Fig. 4 is a horizontal sectional view on the line 4 4 of Fig. 2. Fig. 5 is a perspective of a modified form of another clip of which I make use.

Referring by numerals to the accompanying drawings, 1 is the steering-post of a bicycle, the location of the front wheel relative thereto being shown in dotted lines. The top and bottom of the steering-post are broken away. The lower brace-bar of the bicycle-frame is indicated by 2, only enough of it being shown to illustrate my invention. In the adaptation of my invention I employ two of the clips, provided with apertured extensions, 3, (shown in perspective in Fig. 3,) and one of the clips, provided with apertured extensions, 4, a modified form of which is shown in Fig. 5. The clip 3 is a metal strap bent to fit around the upper ends of the arms of the fork of the steering-post of the bicycle. The ends are brought together a slight distance from the arm, and a screw 5, inserted near the arm, secures said ends firmly together and clamps the clip securely in position. The clip 4 is exactly like the clip 3, except that it is designed to fit on the brace-bar 2 instead of on the fork of the steering-post. An aperture 6 is formed in the end of each of the clips 3 and 4. The normal position of the front bicycle-wheel 7 is shown in dotted lines in Fig. 4.

In Fig. 5 is shown a modified form of the clips 3 and 4. This form of clip has an opening on the side secured by the screw 9.

In the operation of my device when it is desired to lock the bicycle the front wheel 7 is turned from a straight line, as shown in Fig. 4, and this brings the apertured ends of one of the clips 3 and the clip 4 into close proximity. A padlock 8 is used to secure said clips together, as shown. It is obvious that the bicycle can only run in a circle while the padlock 8 remains in position. A locking attachment of my construction is very simple and effective.

I do not wish to limit myself to the exact location shown for the clips of my device. They may be placed in any position which will enable the wheels of the bicycle to be locked and held at an angle relative to each other.

I claim—

1. An attachment for locking bicycles, consisting of a clip designed to be removably and adjustably attached near the upper end of the lower brace-bar, an apertured extension attached to said clip, a second clip designed to be removably and adjustably attached to one of the arms of the steering-post and in horizontal alinement with the first-mentioned clip, a second apertured extension attached to said second clip and projecting toward said first-mentioned apertured extension and a padlock designed to connect said apertured extensions when the wheels of the bicycle stand at an angle relative to each other and it is desired to secure said wheels in such position, substantially as specified.

2. An attachment for locking bicycles, consisting of a clip removably and adjustably attached near the upper end of the lower brace-bar, an apertured extension attached to said clip, clips removably and adjustably attached to the arms of the steering-post in horizontal alinement with the first-mentioned clip, apertured extensions attached to said last-mentioned clips and projecting toward said first-mentioned apertured extension, and a padlock designed to connect said first-mentioned apertured extension with either one of said last-mentioned apertured extensions, when it is desired to lock the wheels of the bicycle in positions at angles relative to each other, substantially as specified.

In testimony whereof I affix my signature in presence of two witnesses.

EDWARD P. DOWD.

Witnesses:
EDWARD E. LONGAN,
S. G. WELLS.